Sept. 5, 1939.  V. P. McVOY  2,172,029
SPRING SHACKLE
Filed Aug. 11, 1938  2 Sheets-Sheet 1
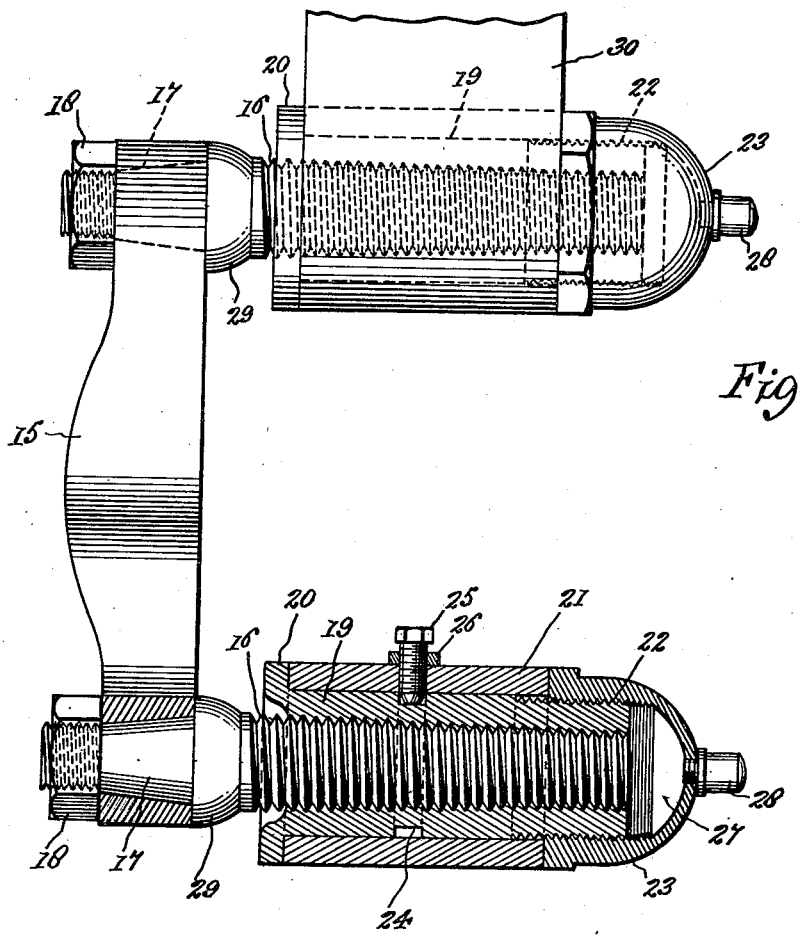
Fig. 1.
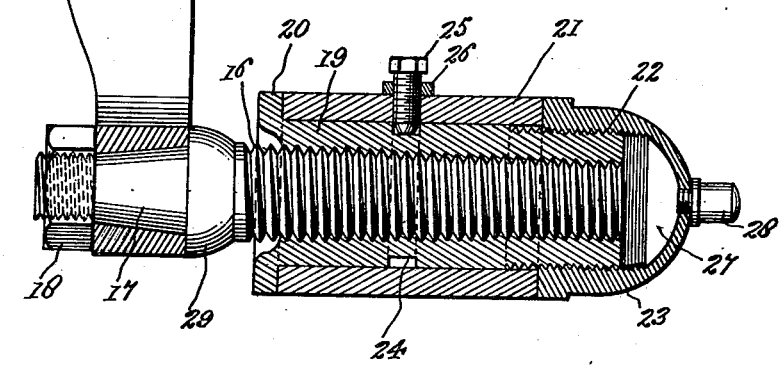
Fig. 2.  Fig. 3.
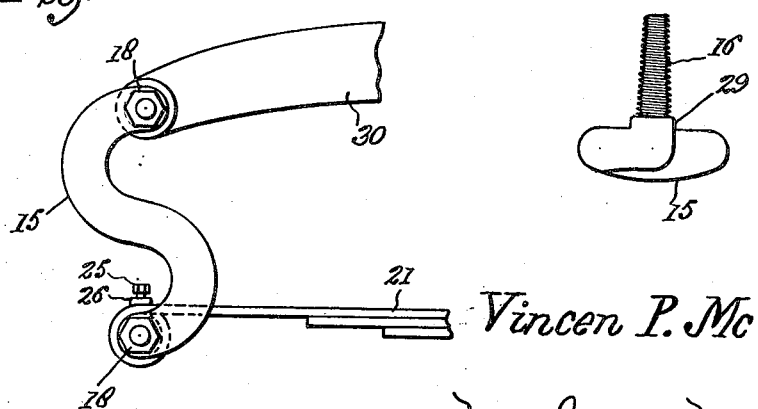
Inventor
Vincen P. McVoy
By Mawhinney & Mawhinney
Attorneys.

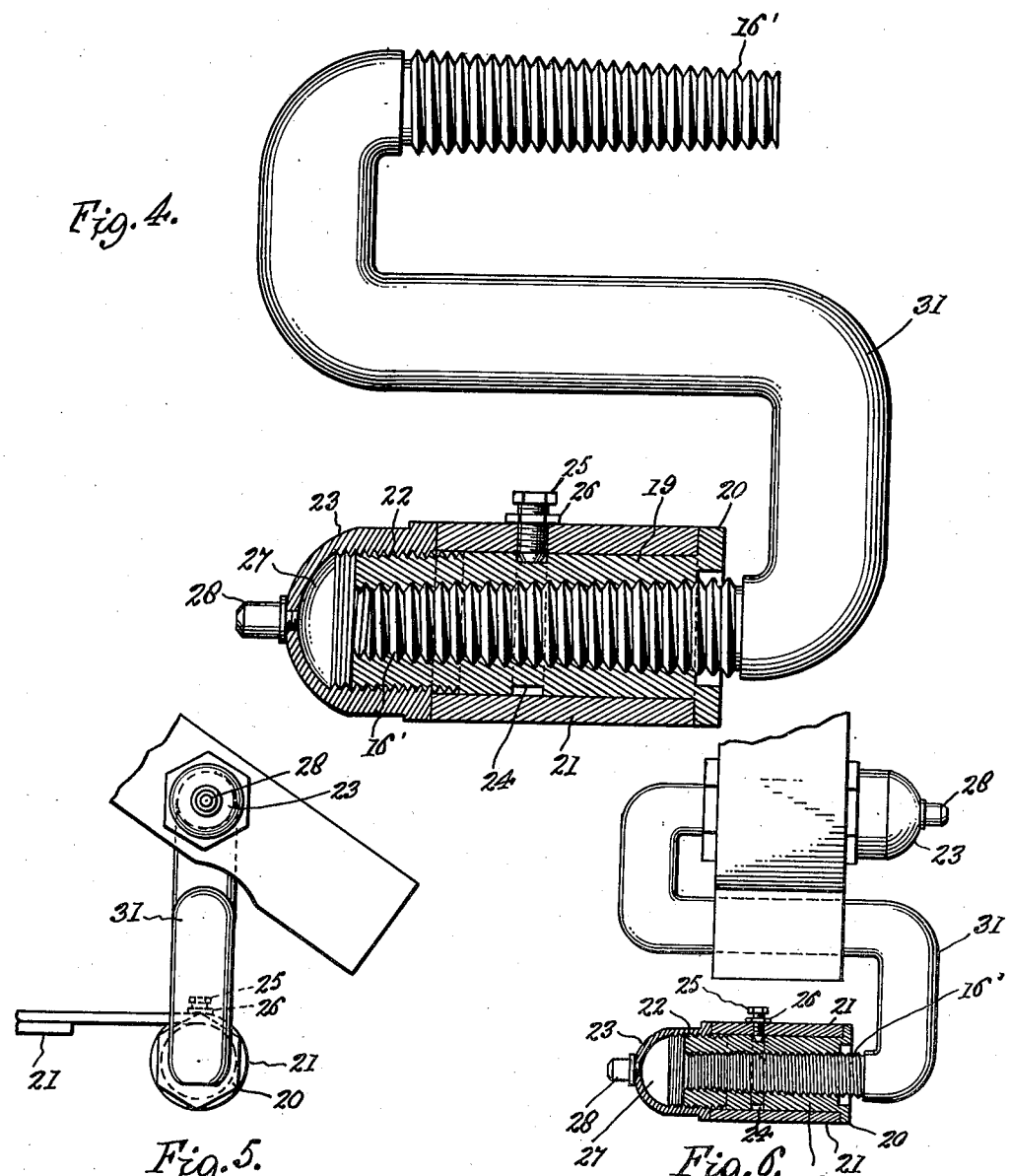

Patented Sept. 5, 1939

2,172,029

UNITED STATES PATENT OFFICE 2,172,029

SPRING SHACKLE

Vincen P. McVoy, Mobile, Ala.

Application August 11, 1938, Serial No. 224,411

6 Claims. (Cl. 267—54)

The present invention relates to spring shackles adapted particularly for use on automobiles and has for an object to improve the construction of shackles to enable the taking up of wear and to maintain the even distribution of the wear and the weight over the entire surface area of all of the bearing parts at all adjustments of the shackle.

Another object of the invention is to provide a shackle with a frame peculiarly constructed to absorb shock and prevent damage to the shackle bearings and spring, the frame being constructed in a novel manner whereby the shackle is not increased in length and size so that it may be readily substituted in automobile construction for the shackles now in general use.

Another object of the invention is to provide a construction of shackle wherein the spindles may be individually replaced upon the shackle frame and wherein the cost of manufacture of the shackle is reduced to a minimum, and a shackle construction which may be quickly and easily applied in the assembly of the automobile.

The present invention has for an object to improve the construction of shackles of the type shown in Patent No. 2,002,284 granted to G. D. Banta May 21, 1935. In this prior patent the wear is on the threaded portion of the spindle and the bushing and the spindle is of uniform diameter throughout so that when the interthreaded portions become worn there is no way in which the wear can be taken up except by turning the bushing onto the unworn threaded portion of the spindle which is at one end thereof only and which comprises but a relatively small short bearing or threaded part which must then support the entire weight and take up all of the wear of the shackle connection. The remaining or outer end portion of the spindle once worn always remains loose and admits of lateral play and cannot be depended upon further as a bearing or supporting surface. According to the present invention applicant's tapering spindle and bushing when worn are merely axially advanced one relatively to the other to take up the wear so that the bearing is tightened and supports the shackle throughout the entire length of the bearing and is in all respects renewed.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is an edge view, partly in section, of a spring shackle constructed according to the present invention and shown as applied to the frame and spring of an automobile.

Figure 2 is a side elevation of the same on a reduced sale.

Figure 3 is a top plan view of the improved shackle frame, showing the tapering threaded spindle.

Figure 4 is an edge view similar to Figure 1 but showing a slightly modified form of shackle frame.

Figure 5 is a side elevation of the same as applied to the frame and spring of an automobile, and Figure 6 is a transverse section thereof.

Referring now to the drawings, and first to Figures 1, 2 and 3, the improved shackle comprises a shackle frame 15 which, as shown in Figure 2, may be of substantially S-shape and which, as shown in Figure 1, may be enlarged or thickened at its intermediate portion to impart the desired strength to the frame 15. The S-shape frame 15 is adapted to absorb abnormal shock to protect the spring and frame of the automobile and support the spring with practical degree of free flexing laterally as well as in a direction toward and from the vehicle frame. The shackle frame 15 is provided with a pair of tapering threaded spindles 16 which extend laterally from the opposite ends of the frame 15 to one side thereof and which may be integrally or otherwise constructed with the shackle frame 15.

In the form shown in Figure 1 the spindles 16 are manufactured independently of the frame 15 and are provided with reduced and tapered studs 17 at their inner ends which are fitted in correspondingly tapered openings in the frame 15 and held therein by nuts 18 or the like as shown. Each spindle 16 is provided with a bushing 19 internally threaded throughout its length and tapered to correspond with the taper of the spindle 16, and which is threaded thereon and is of less length at its inner threaded bore than the length of the spindle 16 so that as the interthreaded portions of the spindle and the bushing wear, the bushing may be turned up sufficiently on the spindle 16 to take up the wear and again tighten the interengaging threaded surfaces to renew the bearing completely throughout its entire length. As shown in Figure 1, the bushing 19 is provided at its inner end with a shoulder 20, and the bushing 19 is of such size as to fit snugly in the eye of the spring 21, and the bushing 19 is adapted to be moved into the eye until shoulder 20 engages one end of the spring eye so as to determine the positioning of the shackle. The outer end of the bushing 19 is provided with a threaded portion 22 over which is fitted a cap 23 adapted to engage the outer end portion of the eye of the spring 21 so as to hold the spring against the shoulder 20 and against the bushing 19. The cap 23 is turned tightly against the spring so as to jam the bushing 19 therein and thus hold the spring and the bushing with the cap 23 as a unit to turn upon the spindle 16.

To prevent the accidental displacement or loosening of the shackle on the spring, the bushing 19 may be provided with an annular groove 24 intermediate its ends for the reception of a set screw 25 which is threaded through the spring eye 21 and secured in adjusted position by jam or lock nut 26 as shown. The cap 23 presents a hollow chamber 27 at the outer end of the spindle and bushing adapted to contain a quantity of grease or other lubricant which may be introduced into the cap through the usual lubricant connection or oil cup 28.

The inner end of the bushing 19 is recessed to admit of the advancement of the bushing inwardly over the tapering spindle and over the enlarged shoulder or base portion 29 of the spindle without jamming the bushing against the shoulder or upon the spindle so that the bushing will have free turning movement on the spindle at all times and at all adjustments. This clearance between the bushing and the shoulder 29 admits of the taking up from time to time of the wear which takes place between the threaded portions of the spindle and the bushing so that the bearing surface at all adjustment extends throughout the entire interengaging threaded portions of the spindle and the bushing and the surface area of the bearing is maintained at all times throughout the entire life of the shackle. The spindle and bushing construction is similar at opposite ends of the shackle, and one bushing 19 is engaged with the spring 21 as shown at the bottom of Figure 1 while the other bushing 19 is engaged through the frame 30 of the chassis.

In the modified construction shown in Figures 4, 5 and 6, the shackle frame 31 is of S-shape but at right angles to the showing in Figure 1 and with one tapering spindle 16' having its enlarged or base portion at one side of the shackle while the opposite spindle 16' has its enlarged or base portion at the opposite side of the shackle. The result accomplished is substantially the same as in Figure 1 because the shackle frame 13 absorbs shock imposed between the spindles 16' and admits of the flexing of the latter from their base portions which connect with the frame 31. The spindle 16' may be integrally constructed with the shackle frame 31 or be mounted thereon as shown in Figure 1. It will be noted that the bushings 19 of the modified form are of the same construction as shown in Figure 1 and all other parts are similar so that the same adjustments may be made with the modified type of shackle as in the other form, and the bearing surface is maintained at all times throughout the entire length of the threaded bore of the bushing.

In assembling the shackle upon an automobile frame the caps 23 are first removed from the outer ends of the bushings 19. The bushings 19 are screwed up firmly upon the tapering spindles 16. The bushings 13 are now inserted from their outer ends through the eye of the spring 21 and the opening or socket in the frame 30 of the chassis frame. The caps 23 are now replaced and turned up on the bushings 19 until they engage the spring and the frame and firmly grip the same and bind them between the bushing shoulders 20 and the caps. Of course the caps 23 and the shouldered portions 20 of the bushings are provided with nut receiving faces of hexagonal form to admit of the adjustment of the various parts. As soon as a bearing becomes worn so that there is play or wear between the spindle 16 and its bushing 19, it is only necessary to slack up the cap nut 23 to free the bushing in the spring or the frame and to then turn the bushing 19 up on the spindle 16 sufficiently to take up the wear when there is re-established a new bearing or gripping surface throughout the entire length of the threaded portion of the bushing. The cap nut 23 is again retightened so as to lock the bushing 19 upon the spring or frame. The bearing is thus completely renewed and the same surface area of bearing is obtained as originally.

What is claimed is:

1. A spring shackle comprising a frame having spindles projecting from the opposite ends thereof and disposed in substantially parallel spaced apart relation, a bushing threaded for a substantial portion of its length upon each spindle and adapted to be secured to the spring and frame of a vehicle for connecting the spring to the frame, each spindle and its bushing having threaded engaging bearing surfaces tapering in one direction and the bushing adapted to turn on the spindle to have bearing thereon, said bushing adapted to be turned up on said spindle in the spring or frame to take up wear between the spindle and bushing and to maintain the original surface threaded contact throughout the threaded portion of the bushing upon the spindle and insure the original surface area of bearing at all adjustments.

2. A spring shackle comprising an S-shaped frame having tapering spindles extending in parallel relation from the opposite ends thereof, bushings having tapering threaded bores threaded upon the spindles and having bearing thereon, means for securing the bushings respectively to the frame and the spring of a vehicle, when the bushings are adjusted on the spindles, said bushings adapted to be turned up on the spindles to take up wear and to maintain the original bearing surface area between the spindle and the bushing.

3. A spring shackle, comprising a frame having reversely curved ends with threaded spindles projecting in substantially parallel relation from the opposite ends of the frame, a bushing threaded upon each spindle and adapted to turn thereon, and means for securing the bushings to the spring and frame of an automobile, each spindle and its bushing tapering in the same direction whereby upon wear between the spindle and bushing the latter may be turned up on the spindle to take up said wear and maintain the original surface area of bearing contact between the spindle and bushing in all relative adjustments therebetween.

4. A spring shackle comprising a frame having reversely curved ends terminating in parallel endwise tapering and externally threaded spindles, a bushing for each spindle having a tapering threaded bore adapted for threaded engagement upon each spindle to provide a substantial surface area of bearing support for each bushing upon its spindle, means for securing the bushings respectively to the frame and spring of a vehicle, said bushings adapted to be turned up on their spindles to take up wear between the bearing threaded portions thereof without reducing the surface area of bearing contact therebetween.

5. A spring shackle comprising an S-shaped frame having a pair of parallel spaced apart spindles extending from one side of the frame at the opposite ends thereof, a bushing mounted on each spindle, each spindle and bushing having interengaging threaded bearing surfaces tapering endwise of the spindle for taking up wear between the spindle and the bushing upon the turning up of the bushing on the spindle, and means for securing the bushings respectively upon the frame and spring of a vehicle.

6. A spring shackle comprising an S-shaped resilient frame, tapering spindles detachably mounted upon the opposite ends of the frame and projecting in parallel relation from one side of the frame, a bushing for each spindle having a tapering threaded bore mounted on the adjacent threaded spindle and having bearing surface throughout the threaded contact area thereof, said bushings adapted to be turned up on the spindles to maintain the original bearing surface area contact, and means for securing the bushings respectively to the frame and spring of the vehicle.

VINCEN P. McVOY.